(No Model.)
W. HILL.
HEAD FOR TUBING MACHINES.
No. 575,888. Patented Jan. 26, 1897.
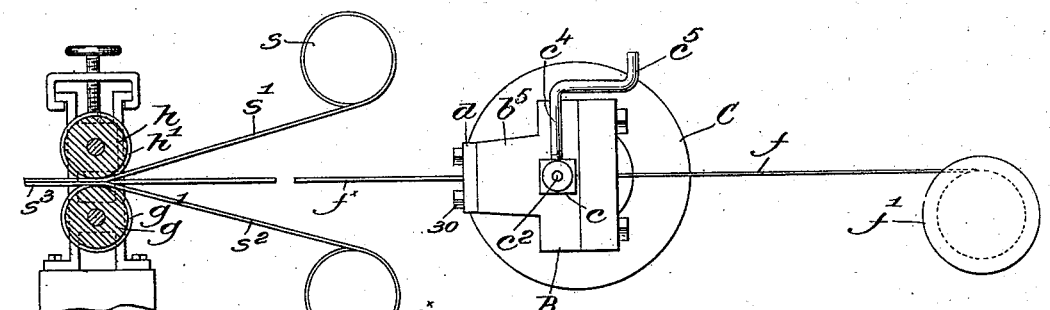
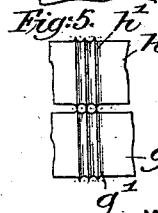
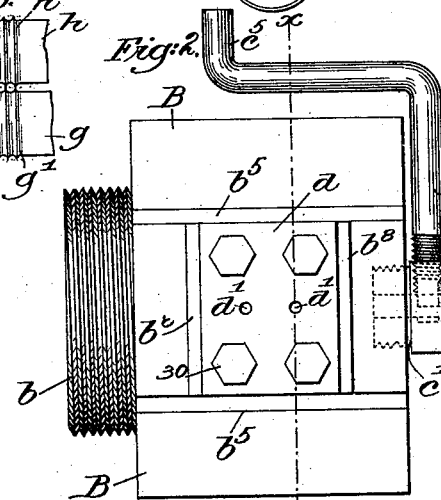
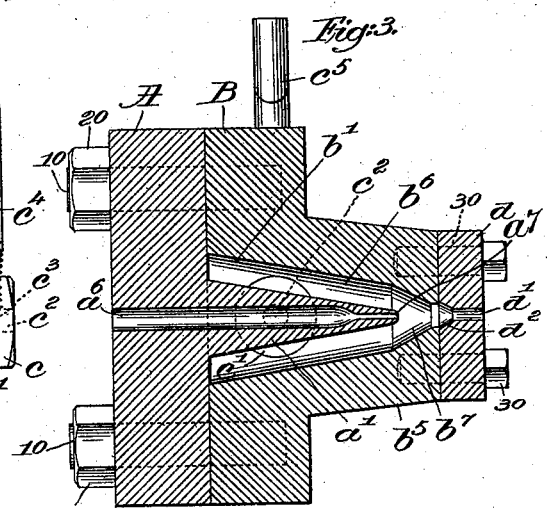
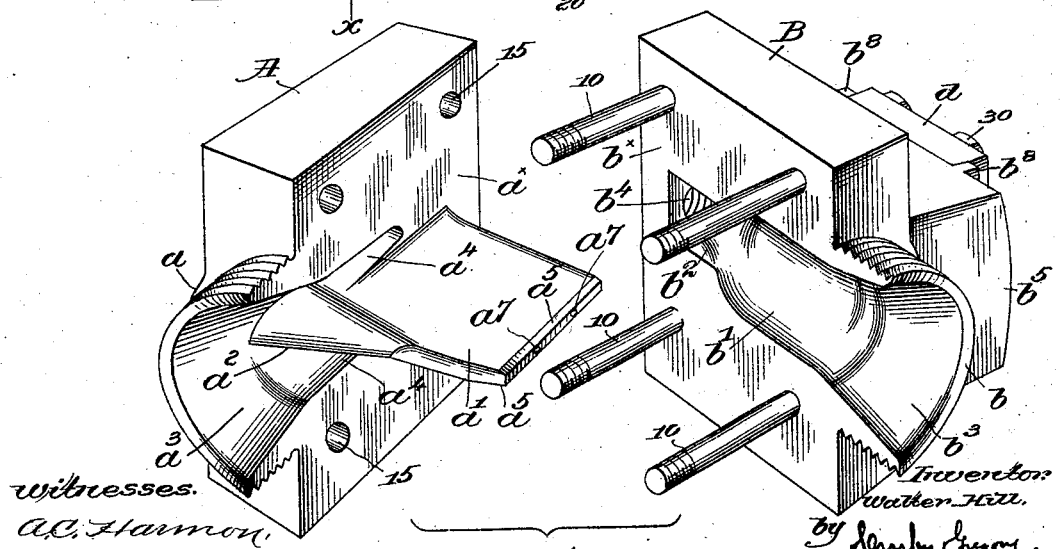

UNITED STATES PATENT OFFICE.

WALTER HILL, OF WALLINGFORD, CONNECTICUT.

HEAD FOR TUBING-MACHINES.

SPECIFICATION forming part of Letters Patent No. 575,888, dated January 26, 1897.

Application filed July 8, 1895. Serial No. 555,187. (No model.)

*To all whom it may concern:*

Be it known that I, WALTER HILL, of Wallingford, county of New Haven, State of Connecticut, have invented an Improvement in Heads for Tubing-Machines, of which the following description, in connection with the accompanying drawings, is a specification, like letters on the drawings representing like parts.

In the manufacture of tubes or tubular envelops from plastic material, as, for instance, rubber, the plastic material is fed into a suitable receiver and forced therethrough by an endless screw or other suitable feeding mechanism into a head having an exit-opening therein of the diameter of the tube or envelop to be produced, the plastic material being forced therethrough by great pressure around a fixed core or mandrel, or if it is desired to cover the core with the envelop such core of suitable material and diameter is drawn through the head and out of the exit-opening at the same rate at which the envelop is formed.

The conditions governing the flow of the plastic material are somewhat peculiar and have a great influence on the product as to uniformity in thickness, density, &c.

When the material is subjected to too great a degree of heat, it will flow through the exit-opening much more rapidly than it will when it is cooler, and the pressure remaining substantially constant variations in the character of the product will result. This is particularly the case in covering a wire or other continuous core and causes variations in the thickness of the tubular envelop, which are very objectionable, and to overcome these defects it is usual to place an attendant at the delivery-opening in the head whose duty it is to handle the product and draw the core through the head at a speed determined by the rate of flow of the enveloping material. When the latter flows too easily, the longitudinal speed of the core is increased to prevent increase in the thickness of the envelop, and when the flow is retarded the speed of the core is decreased to avoid stripping the core or the formation of thin portions of the envelop.

It will be obvious that this method of production is slow, laborious, and expensive and depends altogether upon the skill and quickness of the attendant, and, furthermore, greatly restricts the production of the apparatus, as but a single envelop can be produced at a time.

This invention has for its object the production of means for producing one or a plurality of tubes or envelops with equal facility, of uniform size and density throughout, in a rapid and inexpensive manner, whereby the tube or envelop can be drawn off by power, thus dispensing with an attendant for that purpose and greatly increasing the capacity and output of the apparatus.

My invention also includes the method of producing such tubular envelops.

Figure 1 is a view in side elevation and partially in section of an apparatus embodying my invention adapted to produce simultaneously a plurality of tubes or envelops upon continuous cores. Fig. 2 is an enlarged view in elevation of a head embodying my invention, showing the delivery end thereof. Fig. 3 is a longitudinal sectional view thereof on the line $x$ $x$, Fig. 2, looking toward the right. Fig. 4 is a perspective view of the two parts of the head opened and separated to show the interior construction thereof, and Fig. 5 is a detail view in elevation of the central part of the drawing-rolls shown at the left of Fig. 1.

Inasmuch as the chamber into which the plastic material is fed and forced forward into the head forms no part of my invention and may be of any well-known construction, I have not herein shown the same in detail, one end thereof being shown at C in Fig. 1. This feed-chamber is, as usual, provided with a threaded opening to receive the threaded hub or boss $a$ $b$ of the separable head shown in Figs. 1 to 4, inclusive.

In order to facilitate cleaning and to provide the more readily for its construction, I prefer to make the head in two parts A and B, divided transversely, as shown in Figs. 1 and 4, of cast-iron or other suitable metal, with smooth and plane engaging faces $a^\times b^\times$, Fig. 4.

Threaded connecting rods or ties 10, rigidly secured to one of the parts, as B, are adapted to pass through suitable holes 15 in the part A, and to receive upon their threaded ends retaining-nuts 20 to firmly and securely hold the parts of the head together as one.

The casting forming the part A has projecting from its inner face, about midway between its top and bottom, a centering device or tongue $a'$, its upper and lower surfaces preferably converging, as clearly shown in Figs. 3 and 4, the outer edge of the tongue being beveled, as at $a^2$, and projecting into the flaring opening $a^3$ in the half-hub $a$, the said opening being extended part way along the base of the tongue at top and bottom at $a^4$.

Referring to Fig. 4, the inner face $b^\times$ of the part B is cored out at $b'$, opposite to and to receive the tongue $a'$, its outer end forming a continuation of the flaring opening $b^3$ of the half-hub $b$, so that when the parts of the head are held together a throat is formed by the recessed portions $b'$ $a^4$ and the hub-openings $a^3$ $b^3$, with the tongue $a'$ projecting thereinto from one side.

The inner end of the recess $b'$ is prolonged at $b^2$, and its end wall has a threaded opening $b^4$ therein, to receive a pressure-regulator of suitable construction, (shown best in Fig. 2 as a boss $c$, having a threaded shank $c'$ to enter and be held in the opening $b^4$.)

A hole $c^2$ (see Fig. 1 and dotted lines, Figs. 2 and 3) through the boss $c$ communicates with the throat in the interior of the head, the effective opening of the hole being regulated by a plug-valve $c^3$, threaded into the boss and having its stem $c^4$ provided with a suitable handle $c^5$.

The outer side of the part B is prolonged to form a nose $b^5$, having a passage $b^6$ therein, opening into the recess $b'$ opposite the tongue $a'$ and flared to receive it, as shown clearly in Fig. 3. Just beyond the end of the tongue, when inserted therein, the passage $b^6$ is contracted at $b^7$, and preferably the tip of the tongue is correspondingly beveled at $a^5$. Ribs $b^8$ on the end of the nose $b^5$ form guides for a die $d$, held in place on the nose by headed bolts 30, extended through the die and threaded into the end of the nose.

The die $d$ has one or more apertures or holes $d'$ therein, two being herein shown flared at their inner ends at $d^2$ to communicate directly with the contracted portion $b^7$ of the passage $b^6$ in the nose, the shape and diameter of the apertures $d'$ determining the exterior shape and diameter of the tubular envelop to be made.

One or more passages $a^6$ are formed in the tongue $a'$ and the rear wall of the part A of the head, corresponding in number to the apertures $d'$ in the die and located opposite thereto, said passages being contracted toward the tip of the tongue, as at $a^7$, Figs. 3 and 4, to permit the snug passage therethrough of the core, (shown in Fig. 1 as a wire $f$, led from a suitable reel or holder $f'$.)

In operation, the parts of the head being securely held together and the hub $a$ $b$ screwed into the opening in the end of the feed-chamber, plastic material will be forced therefrom into the throat of the head and about the centering device or tongue $a'$ and thence out through the one or more apertures $d'$ of the die $d$. At the same time the core $f$ is passed through the passage $a^6$ $a^7$ in the tongue and centered opposite the registering-opening $d'$ of the die, and as the core is fed forward through said opening simultaneously with the plastic material the latter will form a tubular envelop thereupon.

Inasmuch as the centering device or tongue $a'$ forms an integral part of the head it is impossible for the core to be non-centered or diverted from its proper course, and between the tip of the tongue and the inner end of the aperture $d'$ the plastic material completely covers and embeds it.

Mention has been made of the effect of variations of temperature upon the flow of the material, and inherent variations in the character of the plastic material itself also occurs, and as the pressure due to the feed is constant means must be provided for counteracting such variable conditions in order to produce a uniform product. This I am enabled to do perfectly by means of the pressure-regulator or relief-valve $c^3$, for by opening it more or less the pressure of the plastic material at the apertures $d'$ of the die is instantly decreased or increased.

In operation the valve is usually opened to permit the flow therethrough of a fine thread of plastic material, the operator loading the feed-chamber with one hand and with the other controlling the valve by means of its handle. Should the flow of material at the die be too rapid, a slight opening of the valve instantly corrects it and reduces it to its proper delivery, and should the exit be too slow at the die closure of the controlling-valve instantly increases the speed of delivery. By means of the pressure-regulator I am thus enabled to employ any desirable form of power-feed to draw the core $f$ through the head at a uniform speed, and in Fig. 1 I have adapted suitably-mounted drawing or feed rolls $g$ $h$ to subserve an additional purpose, rendered possible by my invention.

In the manufacture of insulated conductors it is frequently desirable to put a plurality of insulating-envelops thereon of contrasting colors, and to do this economically I make one or more semicircular grooves $g'$ $h'$, corresponding to the number of cores being covered, in the rolls $g$ and $h$, slightly greater in diameter than the covered core $f^\times$ as it leaves the head, and from reels $s$ and $s^\times$, on opposite sides of the covered core, I draw strips $s'$ and $s^2$, of rubber or other suitable material, and pass them through the rolls $g$ and $h$ with the covered core or cores $f^\times$.

The grooves $g'$ $h'$ compress the material of the strips upon the said covered core, and the edges of the grooves cut the strips longitudinally to the proper width to form an outer seamless sheath $s^3$, securely cemented to the inner tubular envelop, the latter retaining sufficient plasticity to firmly unite the sheath thereto under pressure.

When the second sheath or cover is applied, the rolls will be located nearer the head than when the tubular envelop only is to be applied to the core, in the latter case the rolls being sufficiently far removed to permit the envelop to harden and lose its tackiness.

While I prefer to construct the head as herein shown and to employ a rigid centering device for the core integral with one of the walls of the head, to thereby obviate the necessity of adjusting devices for the same, it is obvious that I may apply the pressure-regulator to other forms of head and thereby control the delivery of the plastic material as it is formed into a tube.

While I have shown the head herein as adapted to produce a plurality of tubes, it is obvious that a single tube or two or more may be produced, depending upon the number of core-passages in the centering device and the number of delivery-apertures in the die, and accordingly my invention is not restricted to the precise construction and arrangement herein shown and described.

If the core or mandrel is retained stationary after being passed through the die, the plastic material will be delivered as a tube, which may be coiled in any desirable manner, so that it will be evident that my invention is equally well adapted to the production of tubing or a tubular envelop on a continuous core.

I claim—

1. A head for tubing-machines having a passage therethrough for the plastic material, a fixed centering device for the core or mandrel extended into said passage, and a pressure-regulator non-adjacent the passage-exit, to control the progress of the plastic material, as a whole through the head, substantially as described.

2. A head for tubing-machines having therein a passage for the plastic material having an inlet-opening at one end and an outlet at the other end, a fixed centering device projecting into said passage toward the outlet, said device having a core or mandrel passage therein in alinement with the outlet, and a pressure-regulator in communication with the passage through the head, to control the progress of the plastic material as a whole through the head, substantially as described.

3. In a head for tubing-machines, a nose having a converging passage therethrough, an inlet-throat communicating with the said passage, a fixed tongue projecting into the passage in the nose and correspondingly converging toward its tip, said tongue having one or more core or mandrel passages therein, a die adapted to be attached to the nose at the outer end of the passage therein and provided with one or more apertures in alinement with the passages in the tongue, and a pressure-regulator to control the passage of plastic material through the die, substantially as described.

4. A separable head for tubing-machines, one of the members thereof having a recess in its inner face, and a delivery-nose having a passage communicating with said recess, the other member having an integral centering device or tongue projecting from its inner face and adapted to enter said recess and nose-passage when the members are assembled, and an opening communicating with said recess, to receive plastic material, substantially as described.

5. A separable head for tubing-machines, comprising two members one of which has a tongue integral therewith to enter an inlet-throat and delivery-passage in the other, said tongue having a plurality of core-passages therethrough, a threaded half-hub on each member, to form the throat-opening, a relief-valve communicating with the interior of the head, a die having a plurality of exit-openings, located at the outer end of the delivery-passage, and means to clamp the members together, substantially as described.

6. In a machine for covering a continuous core, a head to receive plastic material under pressure, a centering device therein through which the core is drawn, an exit-aperture through which the plastic material is discharged about the core, means to draw the covered core from the head at uniform speed, and a pressure-regulator to control the progress of the plastic material as a whole through the head, substantially as described.

In testimony whereof I have signed my name to this specification in the presence of two subscribing witnesses.

WALTER HILL.

Witnesses:
LEON L. HALL,
C. FRED LANE.